United States Patent
Stierle et al.

(10) Patent No.: US 7,127,338 B2
(45) Date of Patent: Oct. 24, 2006

(54) METHOD FOR TESTING THE INFLUENCE OF ELECTROMAGNETIC ENERGY ON A VEHICLE SAFETY SYSTEM DURING A CRASH EVENT

(75) Inventors: Thomas Stierle, Auburn Hills, MI (US); Justin E. Cresswell, Lincoln Park, MI (US)

(73) Assignee: Siemens VDO Automotive Corporation, Auburn Hills ( * ) Notice: Subject to any disclaimer, the term of this patent is extended or adjusted under 35 U.S.C. 154(b) by 102 days.

(21) Appl. No.: 10/411,475

(22) Filed: Apr. 10, 2003

(65) Prior Publication Data

US 2003/0195677 A1    Oct. 16, 2003

Related U.S. Application Data

(60) Provisional application No. 60/371,479, filed on Apr. 10, 2002.

(51) Int. Cl.
 *B60R 21/00* (2006.01)
 *B60R 22/40* (2006.01)
(52) U.S. Cl. .......................... 701/29; 701/47; 280/735
(58) Field of Classification Search .................. 701/29, 701/45, 47; 280/735, 739, 728.1, 802; 342/72; 180/268, 271, 274
See application file for complete search history.

(56) References Cited

U.S. PATENT DOCUMENTS

| | | | |
|---|---|---|---|
| 3,703,702 A * | 11/1972 | Arai ............................ 280/735 |
| 4,608,501 A * | 8/1986 | Andres et al. ............... 180/282 |
| 5,037,129 A * | 8/1991 | Fritz et al. ................... 280/734 |
| 5,164,901 A * | 11/1992 | Blackburn et al. ............ 701/47 |
| 5,291,014 A * | 3/1994 | Brede et al. ............ 250/227.21 |
| 5,770,997 A * | 6/1998 | Kleinberg et al. ........... 340/438 |
| 5,835,873 A * | 11/1998 | Darby et al. .................... 701/45 |
| 6,023,664 A * | 2/2000 | Bennet ........................ 702/141 |
| 6,097,332 A * | 8/2000 | Crosby, II ..................... 342/72 |
| 6,552,550 B1 * | 4/2003 | Karray et al. ................ 324/662 |
| 6,552,657 B1 * | 4/2003 | Long et al. .................. 340/438 |
| 6,623,033 B1 * | 9/2003 | Breed .......................... 280/735 |

\* cited by examiner

*Primary Examiner*—Dalena Tran

(57) ABSTRACT

A vehicle safety system testing method provides an indication of how the safety system responds during a crash event while the system is exposed to electromagnetic energy. The system is exposed to electromagnetic energy to obtain EMI data indicating the system performance under those conditions. Separate crash data indicating the system response to a crash event is obtained using computer simulation or known test equipment. The EMI data is superimposed onto the crash data to provide an indication of how the system performs when exposed to both conditions. In one example, the EMI data is superimposed onto the crash data and the resulting data is provided to the system controller so that the controller response can be determined. In one example, the ability of the system to accurately issue deploy commands to an airbag squib is tested at selected EMI frequencies.

11 Claims, 1 Drawing Sheet

METHOD FOR TESTING THE INFLUENCE OF ELECTROMAGNETIC ENERGY ON A VEHICLE SAFETY SYSTEM DURING A CRASH EVENT

CROSS REFERENCE TO RELATED APPLICATIONS

This application claims priority to U.S. Provisional Application No. 60/371,479, which was filed on Apr. 10, 2002.

1. FIELD OF THE INVENTION

This invention generally relates to vehicle safety systems. More particularly this invention relates to testing vehicle safety systems for performance during a crash event when the system is exposed to electromagnetic energy.

2. DESCRIPTION OF THE RELATED ART

Vehicle safety systems often include a supplemental restraint device such as an airbag. Crash sensors, a controller and other electronics are typically used to control deployment of the supplemental restraint device. A variety of methods of testing such systems to determine whether they will adequately perform under expected conditions have been developed.

One situation that requires testing is determining whether a system will appropriately perform when the system is exposed to electromagnetic energy (i.e., electromagnetic interference or influence (EMI)). There are known methods of testing the ability of a system to perform when exposed to EMI. For example, the system components may be placed within an EMI test chamber and then exposed to electromagnetic energy. The performance of the system under such conditions can be evaluated using known techniques.

Another situation that typically requires testing is how the system performs under crash conditions. There are a variety of known methods for performing such tests. For example, a shaker device may be used to stimulate the system components to simulate a crash condition. By measuring the system performance, the response of the system to crash conditions can be determined. Another method is to use a crash sled or test vehicle to determine how the system components perform responsive to an actual impact event.

There is a need for determining how a system performs during a crash event when the system is exposed to EMI. Such testing has been difficult or left undone because it is not readily possible to place a shaker or crash shed within an EMI test chamber, for example. It has not been possible to simultaneously perform the EMI and crash testing.

There is a need for a method of testing a vehicle safety system to determine how the system responds during a crash event while the system is exposed to EMI. This invention addresses that need.

SUMMARY OF THE INVENTION

In general terms, this invention is a method of testing a vehicle safety system to determine the system's performance during a crash event while the system is exposed to EMI.

One example method designed according to this invention includes obtaining EMI data that indicates the system performance when the system is exposed to EMI. The method also includes obtaining crash data that indicates the system response to at least one type of crash event. The EMI data and the crash data are then used to determine the system performance during the crash event when the system is exposed to EMI.

In one example, the EMI data is superimposed onto the crash data to simulate the crash condition under the influence of the EMI.

In one example, the superimposed EMI and crash data are fed into the system controller in place of the sensor input to the controller. The controller response to the superimposed data then provides an indication of how the system performs under those conditions.

According to one example implementation of this invention, the ability for the controller to provide a sufficient deploy signal to a squib for deploying an airbag, for example, is monitored when the system is exposed to EMI. This example includes identifying particular frequencies at which the controller may be most affected and using those frequencies during test deploy sequences to determine how the system performs.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
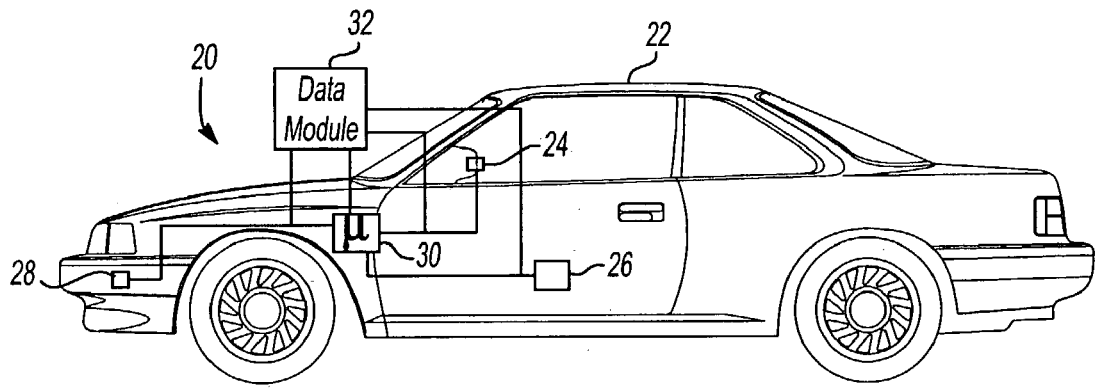
FIG. 1 schematically illustrates a vehicle including a safety system and testing equipment that is useful for performing the method of this invention.

FIG. 1 shows a safety system 20 associated with a vehicle 22. The safety system 20 includes a supplemental restraint device 24, which in this example is an airbag. A plurality of sensors 26 and 28 provide an indication of a crash event or an unsafe vehicle position such as a rollover, for example. The sensor information is processed by a controller 30 that then responsively deploys the supplemental restraining device 24 according to a selected criteria in a known manner.

Although sensors 28 and 26 are schematically illustrated in FIG. 1, which correspond to frontal and side impact sensors, this invention is not restricted to any particular safety arrangement. A variety of sensor inputs to a controller may be used in a safety system that can be tested using this invention. For example, vehicle X, Y, Z and rollover position indicators, seat buckle switches, crash sensors, pressure sensors and other devices may provide information to a controller that then processes that information to decide whether to deploy the supplemental restraint device or utilize other portions of the safety system.

Although a supplemental restraint device 24 is schematically illustrated, this invention is not necessarily limited to any particular safety device or safety system configuration.

The system 20 includes a data module 32 that processes various types of data to test the performance of the safety system when exposed to electromagnetic energy interference or influence (EMI) during a crash event. In one example, the data module 32 includes software that is usable on a suitable PC computer to process the data indicating the system performance in a manner that provides useful information regarding the system performance during a crash while exposed to EMI.

As schematically shown in FIG. 1, the data module 32 is capable of obtaining data regarding system performance at various locations. In one example, the data module 32 gathers information regarding at least the sample rate and filtering of the safety system sensors when the system is exposed to EMI. In one example, the sensor information is recorded with the sensing path unmodified from the manner in which it is placed in use on a vehicle.

Figure 2:
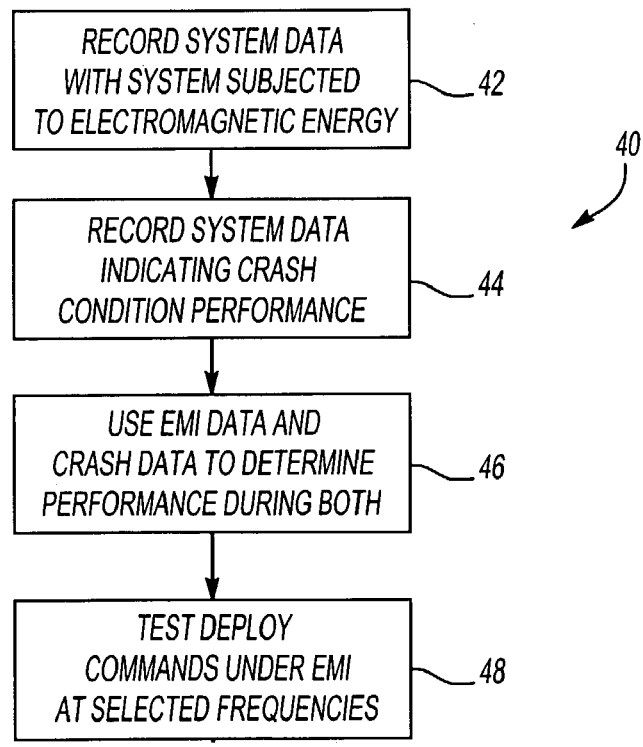
FIG. 2 is a flowchart diagram summarizing the method of this invention.

The flowchart 40 of FIG. 2 summarizes a method designed according to this invention for determining the performance of the safety system during a crash while the system is exposed to EMI. At 42 the system is exposed to electromagnetic energy (EMI) and the appropriate system data is recorded. At 44, data is recorded that indicates the performance of the safety system under crash conditions. The crash data is stored for use by the data module 32. In one example, the crash data is obtained using a computer crash simulation program as known in the art. In another example, appropriate safety system components are placed on a shaker device, for example, and exposed to conditions that simulate a crash condition.

At 46, the EMI data and the crash data are used to determine the performance of the system when both occur. In one example, the data module 32 superimposes the EMI data onto the crash data and feeds that information to the controller 30. The data module 32 then monitors the response of the controller 30 to the simulated sensor input and determines whether the controller 30 accurately issues a deploy command to deploy the supplemental restraint device 24. Conventional digital signal processing techniques are used in one example for superimposing the EMI data onto the crash data. In one example, the data module 32 overrides the input to the controller 30 normally received from the sensors 26 and 28 so that the controller 30 observes input that indicates a crash while the system is exposed to EMI and then follows the normal program routines within the controller to decide how to respond. Monitoring such a response provides an indication of the system performance during a crash while the system 20 is exposed to EMI.

Some example implementations of this invention include another feature. In the example arrangement of FIG. 2, the system is tested at 48 to determine whether it accurately issues deploy commands when the system is exposed to EMI at selected frequencies. This invention includes the recognition that there may be frequencies of electromagnetic energy that cause the controller 30 to inadvertently issue a deploy command to a squib device associated with an airbag. Further, this invention includes the recognition that there may be EMI conditions where the controller 30 is unable to issue a deploy command when it should have been issued. This invention provides the ability to test for either condition.

Selected frequencies preferably are used for testing the deploy commands because many possible EMI frequencies likely will have no effect on the ability of the controller 30 to issue a deploy command. One example way of determining which frequencies to test includes identifying resonance points of the system and the frequencies associated with those points. In one example, the leakage measurements, resistance and base point voltage associated with the squib that is part of the airbag deployment module are used to identify the frequencies at which the deploy command is tested.

Given this description, those skilled in the art will be able to develop software that is capable of performing the testing method of this invention. Those skilled in the art who have the benefit of this description will be able to select the appropriate testing equipment and software to meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of testing a vehicle safety system that has at least one sensor and at least one controller, comprising:
    obtaining EMI data indicating the performance of the sensor and controller when the safety system is exposed to electromagnetic energy;
    obtaining crash data indicating the performance of the safety system during at least one crash event; and
    determining the performance of the safety system during a crash when the system is exposed to electromagnetic energy using the EMI data and the crash data.

2. The method of claim 1, wherein step (C) includes superimposing the EMI data onto the crash data and using the resulting data to determine the performance of the system.

3. The method of claim 2, wherein step (C) includes providing the resulting data to the controller.

4. The method of claim 1, wherein step (B) includes using crash testing equipment and subjecting the system to simulated crash conditions.

5. The method of claim 1, wherein step (B) includes using software to simulate crash performance.

6. The method of claim 1, wherein the system includes a safety device that is deployed responsive to the controller and the method includes determining whether the controller provides a deploy signal to the safety device sufficient to deploy the device when the system is exposed to electromagnetic energy.

7. The method of claim 6, including determining whether the deploy signal is sufficient during a crash at a plurality of selected frequencies.

8. The method of claim 7, including determining frequencies associated with resonance points in the system and using the determined frequencies as the selected frequencies.

9. The method of claim 7, including determining the selected frequencies based upon leakage measurements, resistance and base point voltage values associated with the portion of the system that deploys the safety device.

10. The method of claim 1, including determining whether the controller issues a deployment command to a safety device in the system based only on the EMI data.

11. The method of claim 1, wherein step (A) includes determining system performance values for a signal sample rate and filtering.

* * * * *